United States Patent [19]

Kuo et al.

[11] Patent Number: 6,038,453

[45] Date of Patent: Mar. 14, 2000

[54] METHODOLOGY OF REDUCING AREAS WITH MULTIPLE DOMINANT PILOTS BY ROTATING THE SECTORED ANTENNA POINTING DIRECTION

[75] Inventors: Wen-Yi Kuo, Parsippany; James P. Seymour, Lake Hiawatha; Martin H. Meyers, Montclair; Carl F. Weaver, Morris Plains, all of N.J.

[73] Assignee: Lucent Technologies Inc., Murray Hill, N.J.

[21] Appl. No.: 08/990,332

[22] Filed: Dec. 15, 1997

[51] Int. Cl.[7] .............................. H04B 7/00; H04J 13/00; H04Q 7/02

[52] U.S. Cl. ........................ 455/446; 455/447; 455/562

[58] Field of Search .................................. 455/446, 447, 455/449, 562, 62, 63, 33.1; 370/441, 342, 335, 320, 479; 375/210, 208, 200, 206

[56] References Cited

U.S. PATENT DOCUMENTS

| | | | |
|---|---|---|---|
| 4,128,740 | 12/1978 | Graziano | 455/447 |
| 4,335,388 | 6/1982 | Scott et al. | 342/379 |
| 5,073,971 | 12/1991 | Schaeffer | 455/447 |
| 5,307,507 | 4/1994 | Kanai | 455/447 |
| 5,402,413 | 3/1995 | Dixon | 370/18 |
| 5,459,759 | 10/1995 | Schilling | 375/202 |
| 5,500,856 | 3/1996 | Nagase et al. | 370/342 |
| 5,594,718 | 1/1997 | Weaver, Jr. et al. | 370/331 |
| 5,623,485 | 4/1997 | Bi | 370/441 |
| 5,640,674 | 6/1997 | Dixon | 455/447 |
| 5,649,292 | 7/1997 | Doner | 455/447 |
| 5,771,449 | 6/1998 | Blasing et al. | 455/422 |
| 5,802,474 | 9/1998 | Faruque | 455/447 |
| 5,850,608 | 12/1998 | Faruque | 455/447 |
| 5,859,612 | 1/1999 | Gilhousen | 342/457 |
| 5,883,889 | 3/1999 | Faruque | 370/335 |
| 5,933,787 | 8/1999 | Gilhousen et al. | 455/562 |

*Primary Examiner*—Dwayne D. Bost
*Assistant Examiner*—Joy Redmon

[57] ABSTRACT

A method for reducing multiple dominant pilots in a CDMA communication system comprises determining nulls of a first cell and pointing a sector antenna of a neighboring second cell towards one of said nulls of the first cell. A system is also described.

18 Claims, 5 Drawing Sheets

METHODOLOGY OF REDUCING AREAS WITH MULTIPLE DOMINANT PILOTS BY ROTATING THE SECTORED ANTENNA POINTING DIRECTION

FIELD OF THE INVENTION

This invention relates to wireless communications, and more particularly to code division multiple access (CDMA) wireless communications.

BACKGROUND OF THE INVENTION

Wireless mobile communications provides the greatest convenience for users to access voice and data services essentially anywhere and anytime. CDMA communication systems are one of the most promising digital wireless communication systems that can provide the desired mix of voice and data services. In addition, CDMA systems have features such as soft handoff and frequency reuse which makes CDMA a much more attractive choice than other access technologies such as TDMA and GSM.

Soft handoff is a handoff technique that allows a mobile unit to communicate with two or more base stations at the same time. Soft handoff can not only eliminate the potential ping-ponging of handoff but also provides for a smooth transition at handoff without necessitating mute time. Unlike other access technologies, soft handoff can be implemented in CDMA systems because CDMA systems allows the same frequency to be reused between cells. In addition, allowing frequency reuse between cells in CDMA systems means that frequency planning, which is one of the most difficult tasks in other access technologies such as TDMA, GSM, and AMPS etc., is no longer necessary.

However, CDMA systems has its own set of issues and concerns. One issue related to successful soft handoff and allowing frequency reuse between cells everywhere is the interference pattern. In practical field deployment, there are unavoidable situations in some areas that result in the coexistence of several dominant pilots. That is, several base stations has roughly equal path loss to the same area. It should be noted that each base station has a unique pilot which serves as a beacon for that particular base station.

The issues associated with the situation of multiple dominant pilots are three folds. First, since several base stations are of roughly equal path loss, the signals from them are interfering each other. In order to maintain the call, all these base stations have to be involved in the soft handoff with the mobile unit sooner or later. If the mobile unit is moving at a fast relatively speed, then fast handoff is critical to the survival of the call. This fast handoff requirement presents a large challenge for both the mobile units and infrastructure on the processing hardware. Second, when a high number of base stations are involved in a soft handoff this presents a high overhead on the transmit power needs and degrades the actual capacity of the wireless system. Third, the areas which have the multiple dominant pilots are areas that have a higher probability of dropping calls or degrading voice quality.

It would be beneficial to reduce areas that can have multiple dominant pilots in place or equivalently to reduce the number of pilots that are within several dBs of the strongest pilot.

SUMMARY OF THE INVENTION

The present invention is a method for reducing multiple dominant pilots in a CDMA communication system. The method comprises determining nulls of a first cell and pointing a sector antenna of a neighboring second cell towards one of said nulls of the first cell.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for a CDMA system and shall be so described, the present invention is equally well suited for use with other systems including Wideband CDMA (W-CDMA).

Figure 1:
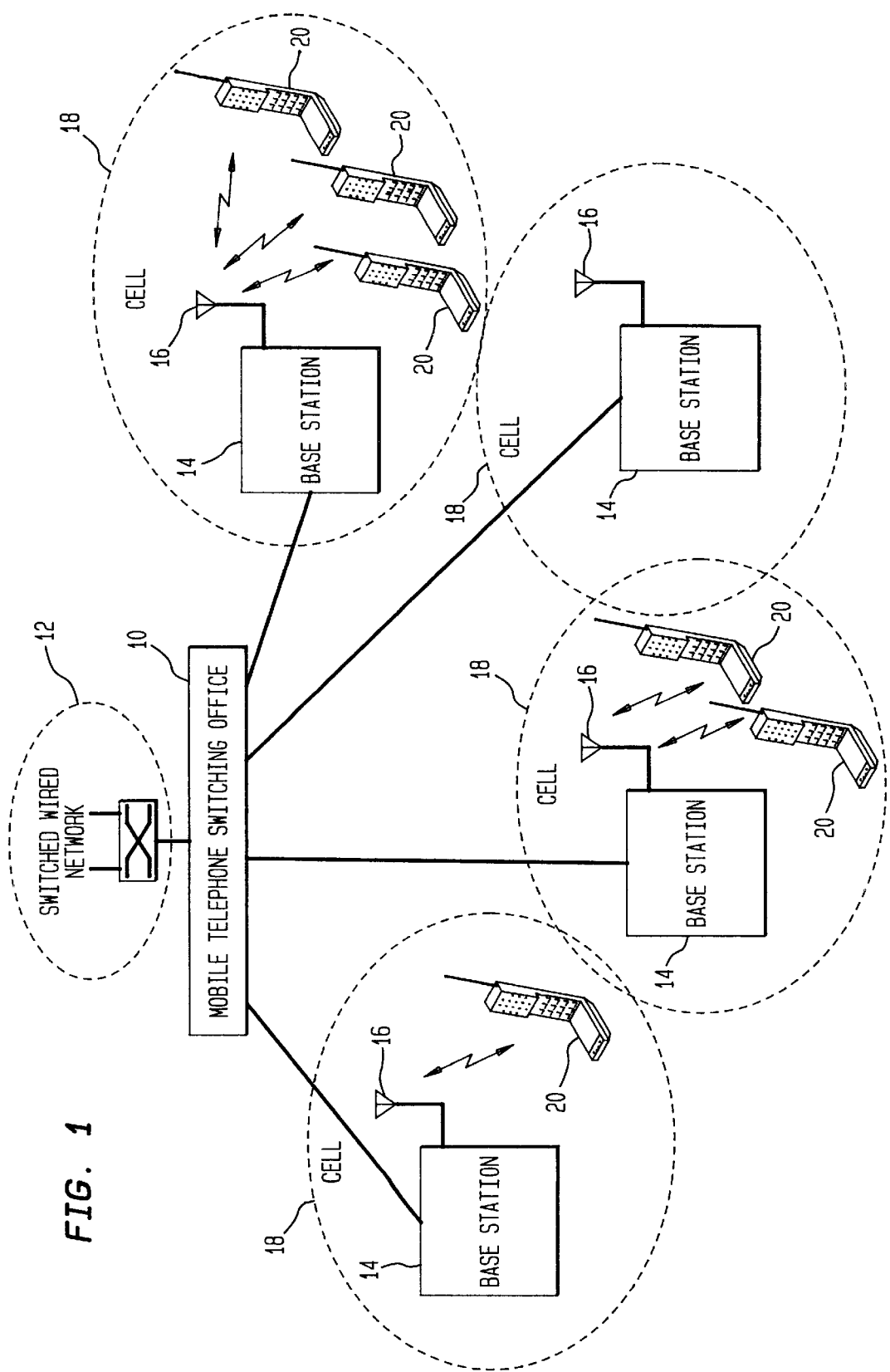
FIG. 1 is a representative block diagram of a typical wireless network.

CDMA modulation techniques are employed in communication systems in order to permit a large number of users to communicate. In a typical CDMA communication system, all communication channels are multiplexed into one or several common broadband frequencies. Each channel is differentiated by a unique spreading code. Prior to transmission, each channel's information signal is modulated with a spreading code in order to convert the information signal into a broadband signal. A receiver demodulates the received broadband signal by combining the broadband signal with the corresponding spreading code to recover the information signal. The spreading code is typically a binary code. Since the same wideband is available to all users, information signals in other channels may appear as co-channel interference or noise when the received signal is demodulated by the spreading code. Referring now to FIG. 1 there is shown a representative block diagram of a typical cellular wireless network. A Mobile Telephone Switching Office (MTSO) 10, also know as a Mobile Switching Center (MSC), provides for switching calls between the cellular network and the switched wired network 12. The MTSO 10 controls the entire operation of a cellular system, setting up and monitoring all cellular calls, and tracking the location of all cellular-equipped vehicles traveling in the system, arranging hand-offs, and providing billing information. The MTSO 10 is connected to a plurality of cellular base stations 14. The cellular base station 14 is a fixed position multi-channel transceiver in the wireless network, which is coupled through a radio port to a cellular antenna 16. The geographical area for which the cellular base station 14 acts as the communication gateway is called a cell 18, the various cellular base station 14 cell nodes are distributed in suitable locations. A cellular mobile unit 20 communicates with the cellular base station 14 within a particular cell 18 through a forward link and a reverse link.

Field deployment of CDMA systems result in an unavoidable situation that from time to time results in several dominant pilots in one area. The signals from several base stations are interfering with each other and with little motion or shadow fading change, the relative signal strength can change significantly. The existence of several dominant pilots has a negative effect on access success rate and the ability to have smooth and quick soft hand-offs. It would be beneficial to reduce the number of multiple dominant pilots as well as the areas they occur in.

The characteristics of an area having multiple dominant pilots is that the signal strength from several base stations 14 are within a close range of each other, such as within 3 to 6 dB. By the signals being so close, they interfere with each other such that with a small amount of motion by a cellular mobile unit 20 or shadow fading change, the relative signal strength can change significantly. Two significant problems occur as a result of this characteristic. First, if a cellular mobile unit 20 originates or responds to a page in the area having multiple dominant pilots, the cellular mobile unit 20 can only lock on one pilot from one base station 14. The cellular mobile unit 20 sends out access probes to the base station 14 that it has locked on to, requesting services. Desirably, the cellular mobile unit 20 will within a couple of seconds of call processing go into soft hand-off to secure the call. Before the call is secured and soft hand-off occurs, the cellular mobile unit 20 is operating in simplex, talking with only one base station 14. The relative signal strength from the one base station 14 can change rapidly and significantly, which will result in the call being killed before it is secured. Second, if the cellular mobile unit 20 with an on-going call enters an area having multiple dominant pilots, there is a high potential need to perform hand-off activities. If the cellular mobile unit 20 is in medium, to high speed motion, then the hand-off speed need to be quick enough, otherwise the call quality will degrade and even result in the call being dropped.

Figure 2:
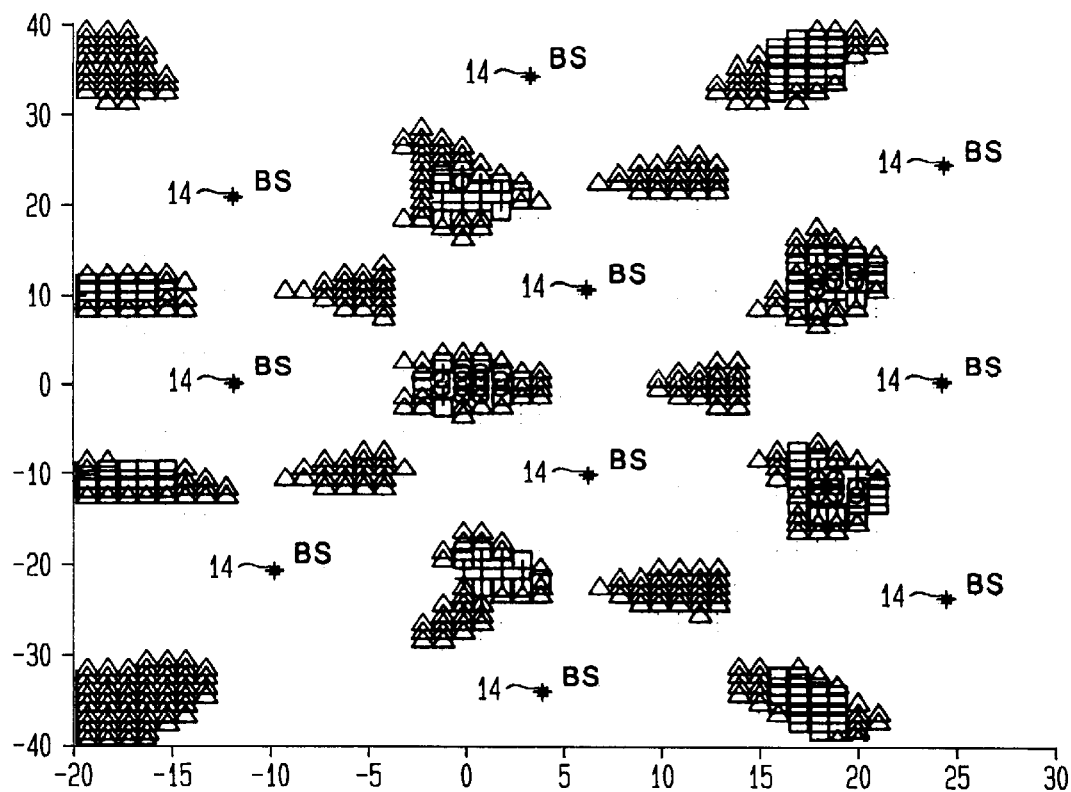
FIG. 2 is a graphical representation of pilot signals that are within 6 dBs of the strongest pilot signal for a typical CDMA communication system.
Figure 3:
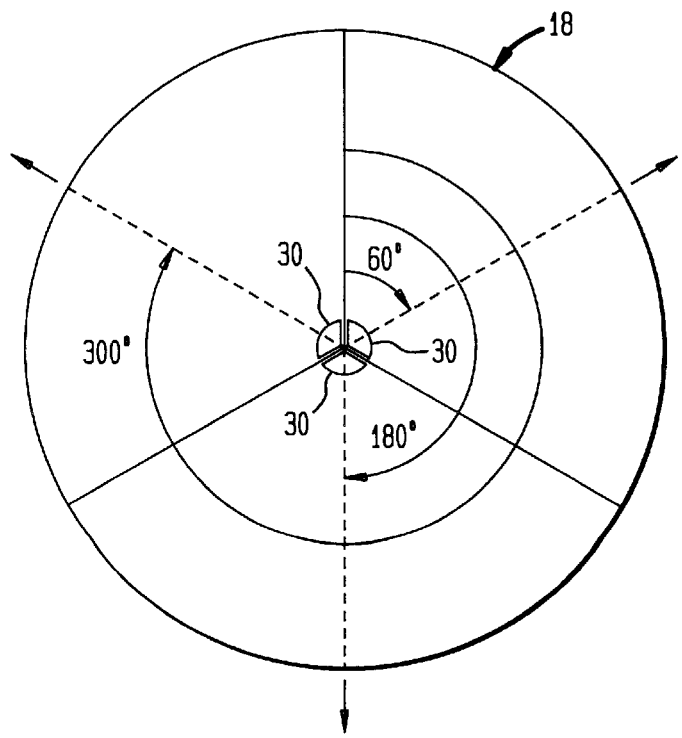
FIG. 3 is a diagrammatic representation of a CDMA cell showing three sectors.

Referring to FIG. 2 there is shown a graphical representation of pilot signals that are within 6 dBs of the strongest pilot signal for a typical CDMA system showing ten base stations 14 which represent ten cells 18. Referring to FIG. 3 it can be seen that each cell 18 is typically composed of three sectors. A 92 degree antenna is used for the sectored antenna 30. The three sector antennas 30 are pointed in directions of 60 degrees, 180 degrees and 300 degrees. Referring back to FIG. 2, an asterisk represents the placement of the three sector antennas for a cell 18. The number of multiple pilots within 6 dB of the strongest pilot are represented by a dot for two, by a triangle for three, by a square for four, by a plus for five and by a circle for six or more.

In order to reduce the number of dominant pilots in a high density area of multiple dominant pilots, the present invention utilizes a rotation of the sectored antennas 30 relative to the traditional cellular layout of sectored antennas. The principle of this kind of rotation is to point each sectored antenna towards the nulls of its neighboring cell such that the neighboring cells coverage are compensating each other instead of interfering with each other. Nulls of a cell are typically the area between sectors where signals transmitted from the adjacent sectors are approximately equal and minimal. The nulls of a cell are typically located at approximately 30 degrees relative to the neighboring cell.

Figure 4:
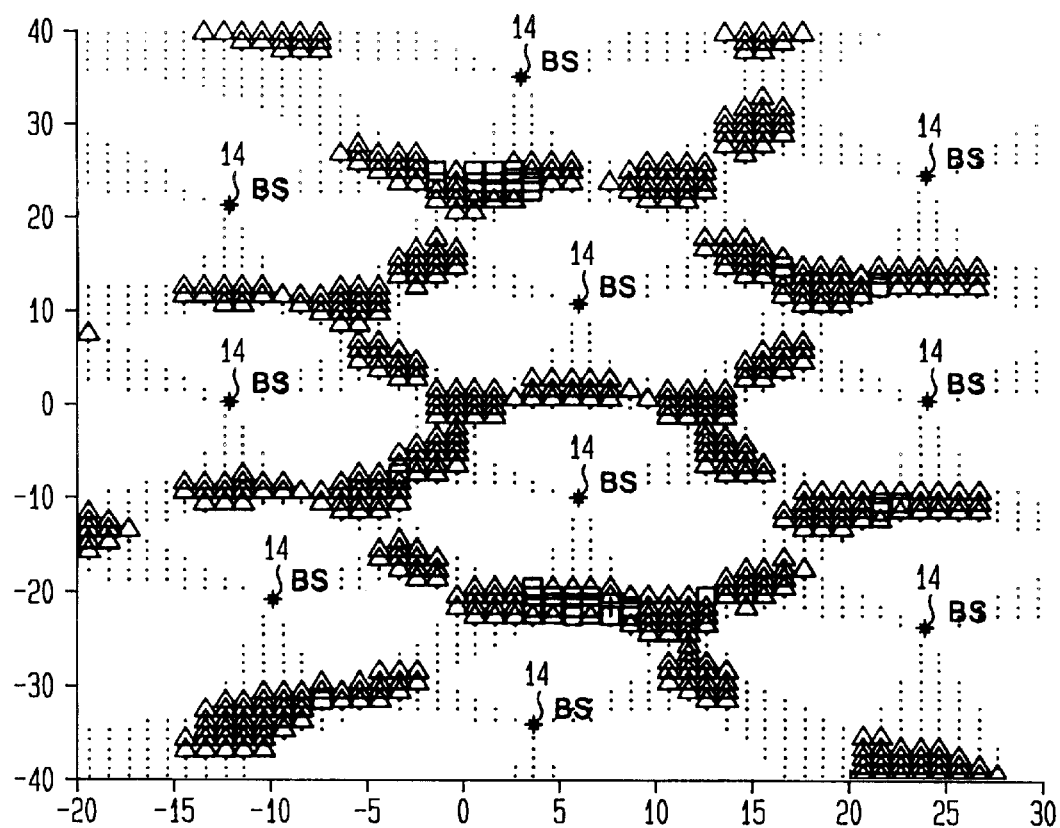
FIG. 4 is a graphical representation of pilot signals that are within 6 dBs of the strongest pilot signal for a CDMA system employing the present invention.

Referring to FIG. 4 there is shown a graphical representation of pilot signals that are within 6 dBs of the strongest pilot signal for a CDMA system employing the present invention showing ten base stations 14 which represent ten cells 18. An asterisk represents the placement of the three sector antennas for a cell 18. A star (five pointed) represents the placement of a simulcasting element 40. The number of multiple pilots within 6 dB of the strongest pilot are represented by a dot for two, by a triangle for three, by a square for four, by a plus for five and by a circle for six or more. The sectored antennas at each cell are pointing at 90 degrees, 210 degrees and 330 degrees receptively. The areas with significant numbers of multiple pilots that are within 6 dB of the strongest pilot are reduced. This reduction is seen by comparing FIGS. 2 and 4.

Figure 5:
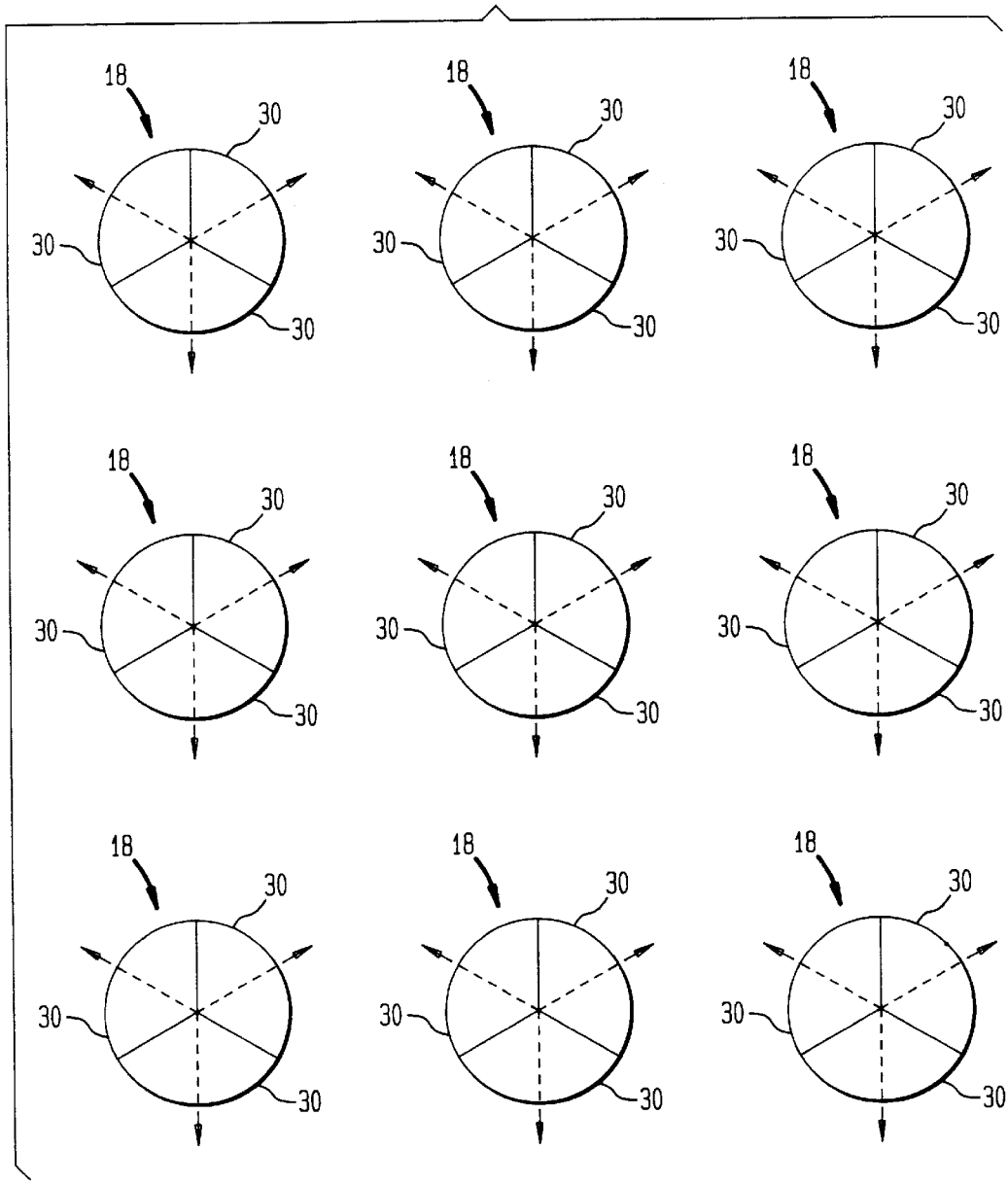
FIG. 5 is a diagrammatic representation of nine cells in a representative CDMA communication system.

Referring to FIG. 5, there is shown nine cells 18 in a representative CDMA system. It can be seen that each cell 18 is typically composed of three sectors. A 92 degree antenna is used for the sectored antenna 30. The three sector antennas are pointed in directions of 60 degrees, 180 degrees and 300 degrees.

Figure 6:
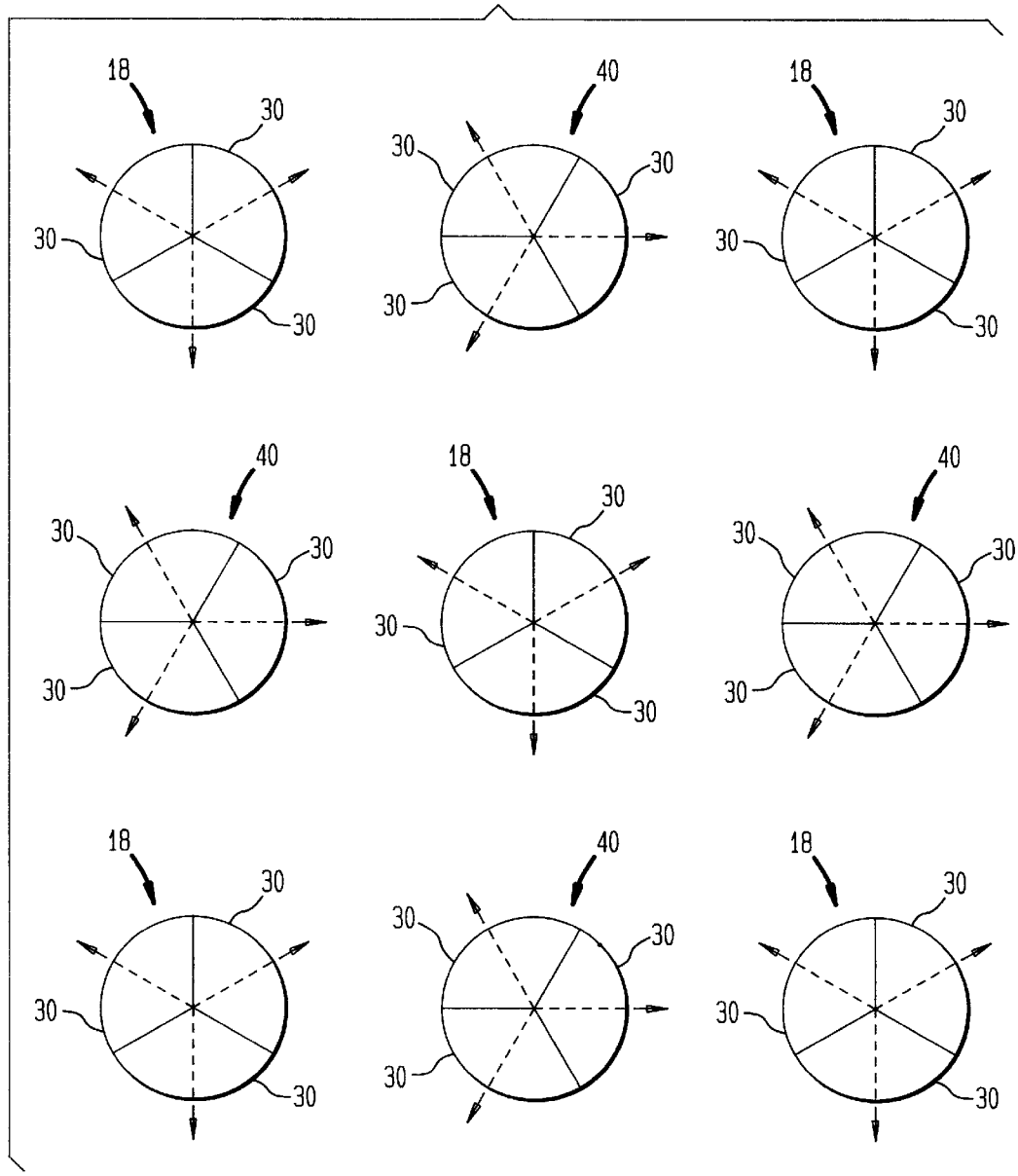
FIG. 6 is a diagrammatic representation of nine cells in a CDMA communication system employing the present invention.

Referring to FIG. 6, there is shown a diagrammatic representation of nine cells in a CDMA system employing the present invention. In this exemplary embodiment sectored antennas are rotated towards the nulls of its neighboring cell such that the neighboring cells coverage are compensating each other instead of interfering with each other. The rotated cells 40 have their sectored antennas at each cell are pointing at 90 degrees, 210 degrees and 330 degrees receptively while the other cells 18 remain pointed at 60 degrees, 180 degrees and 300 degrees.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The actual alignment of neighboring cells and the particular cells that are rotated can be varied. Details of the structure may be varied substantially without departing from the spirit of the invention and the exclusive use of all modifications which come within the scope of the appended claim is reserved.

What is claimed:

1. A method for reducing multiple dominant pilots in a CDMA communication system comprising the steps of:

determining nulls of a first cell; and pointing a sector antenna of a neighboring second cell towards one of said nulls of said first cell.

2. The method as recited in claim 1 wherein the step of pointing further comprises rotating said sector antenna approximately thirty degrees from a uniform position.

3. The method as recited in claim 1 wherein the step of pointing further comprises rotating said sector antenna approximately thirty degrees relative to alignment of said first cell.

4. The method as recited in claim 1 wherein the step of pointing further comprises pointing a sector antenna of a neighboring second cell towards nearest of said nulls of said first cell.

5. The method as recited in claim 1 further comprising the step of pointing another sector antenna of a neighboring third cell towards one of said nulls of said first cell.

6. The method as recited in claim 1 further comprising the step of pointing another sector antenna of a neighboring third cell towards nearest of said nulls of said first cell.

7. A method for reducing multiple dominant pilots in a CDMA communication system comprising the steps of:

determining nulls of a plurality of cells; and pointing a sector antenna of a neighboring cell towards one of said nulls of a first cell of said plurality of cells.

8. The method as recited in claim 7 wherein the step of pointing further comprises rotating said sector antenna approximately thirty degrees from a uniform position.

9. The method as recited in claim 7 wherein the step of pointing further comprises rotating said sector antenna approximately thirty degrees relative to alignment of said one of said plurality of cells.

10. The method as recited in claim 7 wherein the step of pointing further comprises pointing a sector antenna of a neighboring second cell towards nearest null of said one of said plurality of cells.

11. The method as recited in claim 7 further comprising the step of pointing another sector antenna of a neighboring third cell towards one null of said one of said plurality of cells.

12. The method as recited in claim 7 further comprising the step of pointing another sector antenna of a neighboring third cell towards nearest null of said one of said plurality of cells.

13. A system for reducing multiple dominant pilots in a CDMA communication network, the system comprises:

a first cell having predetermined nulls; and a sector antenna of a neighboring second cell wherein said sector antenna is pointed towards one of said predetermined nulls of said first cell.

14. The system as recited in claim 13 wherein said sector antenna is pointed approximately thirty degrees from a uniform position.

15. The system as recited in claim 13 wherein said sector antenna is pointed approximately thirty degrees relative to alignment of said first cell.

16. The system as recited in claim 13 wherein said sector antenna of said neighboring second cell is pointed towards a nearest null of said predetermined nulls of said first cell.

17. The system as recited in claim 13 further comprising another sector antenna of a neighboring third cell wherein said another sector antenna is pointed towards one of said predetermined nulls of said first cell.

18. The system as recited in claim 13 further comprising another sector antenna of a neighboring third cell wherein said another sector antenna is pointed towards nearest of said predetermined nulls of said first cell.

\* \* \* \* \*